(12) United States Patent
Seo et al.

(10) Patent No.: US 7,002,743 B2
(45) Date of Patent: Feb. 21, 2006

(54) POLARIZATION CONVERSION SYSTEM

(75) Inventors: Eun Seong Seo, Seoul-si (KR); Young Woon Kim, Suwon-si (KR); Ho Young Choi, Yongin-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/650,921

(22) Filed: Aug. 29, 2003

(65) Prior Publication Data

US 2005/0248845 A1 Nov. 10, 2005

(30) Foreign Application Priority Data

Aug. 30, 2002 (KR) ............... 10-2002-0052010

(51) Int. Cl.
*G02B 5/30* (2006.01)
*G02B 27/28* (2006.01)
*G03B 21/14* (2006.01)

(52) U.S. Cl. ............... 359/486; 359/485; 359/494; 362/19; 353/20

(58) Field of Classification Search ............... 359/486, 359/483, 485, 487, 494; 362/19; 353/20
See application file for complete search history.

(56) References Cited

U.S. PATENT DOCUMENTS

| | | | | |
|---|---|---|---|---|
| 5,387,953 A | * | 2/1995 | Minoura et al. | 353/20 |
| 5,566,367 A | * | 10/1996 | Mitsutake et al. | 359/497 |
| 6,092,901 A | * | 7/2000 | Hashizume et al. | 362/19 |
| 6,109,752 A | * | 8/2000 | Itoh et al. | 353/98 |
| 6,144,492 A | * | 11/2000 | Iwamura et al. | 359/487 |
| 6,147,802 A | * | 11/2000 | Itoh et al. | 359/500 |
| 6,154,320 A | * | 11/2000 | Itoh et al. | 359/629 |
| 6,394,607 B1 | * | 5/2002 | Hashizume et al. | 353/31 |
| 6,588,905 B1 | * | 7/2003 | Sekine | 353/20 |
| 6,646,690 B1 | * | 11/2003 | Takezawa | 349/9 |
| 6,909,473 B1 | * | 6/2005 | Mi et al. | 349/5 |
| 2002/0018150 A1 | * | 2/2002 | Ogawa et al. | 349/9 |
| 2003/0071972 A1 | * | 4/2003 | Ito et al. | 353/20 |
| 2003/0072079 A1 | * | 4/2003 | Silverstein et al. | 359/486 |
| 2003/0156325 A1 | * | 8/2003 | Hoshi | 359/486 |
| 2004/0207818 A1 | * | 10/2004 | Stahl | 353/38 |
| 2005/0036119 A1 | * | 2/2005 | Ruda et al. | 353/99 |

FOREIGN PATENT DOCUMENTS

JP 07294906 A * 11/1995

* cited by examiner

*Primary Examiner*—John Juba, Jr.
(74) *Attorney, Agent, or Firm*—Birch, Stewart, Kolasch & Birch, LLP

(57) ABSTRACT

A polarization conversion system comprises a glass substrate; reflection type polarization plates, formed between top and bottom surfaces of the glass substrate and inclined at a predetermined angle, separating unpolarized incident light into two polarization directions where two directions are at a right angle to each other; polarization conversion plates coupled to the reflection type polarization plates, converting a polarization direction of polarization light by the reflection type polarization plates; and reflection plates positioned in parallel with the reflection type polarization plates, reflecting incident light from the reflection type polarization plates.

4 Claims, 3 Drawing Sheets

POLARIZATION CONVERSION SYSTEM

This Nonprovisional application claims priority under 35 U.S.C. § 119(a) on Patent Application No(s). 52010/2002 filed in Republic of Korea on Aug. 30, 2002, the entire contents of which are hereby incorporated by reference.

BACKGROUND OF THE INVENTION

1. Field of the Invention

The present invention relates to an optical polarization conversion system applicable to projection TVs and monitors, more particularly, to a polarization conversion system constructed of a polarization conversion plate coupled to a reflection type polarizing plate having a metal grating pattern.

2. Discussion of the Background Art

Along with the scale-up trend of TVs, more researches are now focused on a projection system.

A typically used image element for the projection system includes a liquid crystal deposited on polysilicon and silicon crystal, or a nano-technique based DMD (Digital Micromirror Display).

Particularly, a projection system using the LCD displays a screen by modulating the polarization of light. In other words, when it is necessary to irradiate a light to a liquid crystal, the light should be polarized. To do so, a lot of elements are needed to convert unpolarized light to polarized light.

One of the elements is a reflection type polarizer. FIG. 1 illustrates one embodiment of such reflection type polarizer.

A reflection type polarizing plate in FIG. 1 acts as a diffraction grating if a gap formed on the polarizer is greater than a wavelength of incident light. And if the gap is smaller than a wavelength, the reflection type polarizing plate goes back to its role as a polarization plate. Taking advantage of these features, an aluminum line is implanted on a glass substrate at a frequency smaller than the wavelength.

In addition, the reflection type polarizing plate in FIG. 1 transmits a polarized light whose electric field vertically vibrates to the grating, and splits or isolates a polarized light whose electric field horizontally vibrates to the grating.

Among traditional polarization conversion systems, there is one using a Polarization Beam Splitter (hereinafter, it is referred to as 'PBS') array. The PBS array is an element that converts unpolarized light emitted from a light source to one type of polarized light. The PBS, using specific lamination between two glass members, transmits P-waves and reflects S-waves.

The PBS array is a multi-layered PBS.

FIG. 2 shows one embodiment of an optical system to which the PBS array is applied. As depicted in the drawing, there is a fly-eye lens 201 uniformly splitting a light beam incidented on a front end of the PBS array 202 and at the same time converging the split beams. This fly-eye lens array is what creates on the PBS array 202 bright and dark portions, namely a portion where the light is incident and another portion where the light is not incident.

To polarize light in one direction only, a λ/2 plate 203 is provided to an emission surface of the PBS positioned at a portion where light is incident, and no λ/2 plate 203 is provided to the PBS positioned at a portion where light is not incident.

The λ/2 plate 203 is a polarization conversion plate converting the direction of linear polarized light. For example, it converts S-waves (i.e. vertical linear polarized light) to P-waves (i.e. horizontal linear polarized light), and P-waves to S-waves.

For instance, suppose that the polarization beam splitters in the PBS array are manufactured to transmit P-waves and reflect S-waves. Therefore, when P-polarized light incidents upon the PBS array 202 through the fly-eye lens 201, the P-polarized light transmits a corresponding PBS and eventually is incident on the λ/2 plate 203. The λ/2 plate 203 then converts the P-wave to S-wave and emits. This converted S-wave travels via a relay lens 204 and is emitted to a panel 205.

On the other hand, when S-polarized light incidents upon the PBS array 202 through the fly-eye lens 201, the S-polarized light is reflected by a corresponding PBS and incidents on a PBS without the λ/2 plate 203. This PBS without the λ/2 plate 203 again reflects the reflected incident S-wave and emits it to the panel 205. As a result, only S-polarized light incidents upon the panel 205.

Also, even though unpolarized light may be incident on the PBS array 202 through the fly-eye lens 201, a PBS with the λ/2 plate 203 transmits only P-waves to the λ/2 plate 203, and reflects S-waves onto a PBS without the λ/2 plate 203. As such, S-waves being converted at the λ/2 plate 203, and S-waves being reflected from the PBS without the λ/2 plate 203 are emitted to the panel 205.

However, the above-mentioned PBS works best only for light received at a fixed angle, and loses its role if light-receiving angle is changed even a little bit. The same problem is found in the PBS array also.

As another matter, PBS glasses are easily heated up as the intensity of light is increased. Hot glasses in turn cause stresses and these stresses generate problems like photoelasticity and non-uniform refraction index.

That is, as the temperature of a PBS lamination surface is increased, photoelasticity phenomenon occurs on glass material or refraction index is changed, so polarization itself gets lost. Moreover, with the current techniques, an allowable F/# is hardly greater than F/2.3.

SUMMARY OF THE INVENTION

An object of the invention is to solve at least the above problems and/or disadvantages and to provide at least the advantages described hereinafter.

Accordingly, one object of the present invention is to solve the foregoing problems by providing a polarization conversion system having a simple structure and a capability of preventing deterioration in performance due to a PBS array's angle and heat, by utilizing a reflection type polarization plate with a grating pattern and a polarization conversion plate coupled to the reflection type polarization plate to polarize light in one direction.

The foregoing and other objects and advantages are realized by providing a polarization conversion system including: a glass substrate; reflection type polarization plates, formed between top and bottom surfaces of the glass substrate and inclined at a predetermined angle, separating unpolarized incident light into two polarization directions where two directions are at a right angle to each other; polarization conversion plates coupled to the reflection type polarization plates, converting a polarization direction of polarized light by the reflection type polarization plates; and reflection plates positioned in parallel with the reflection type polarization plates, reflecting incident light from the reflection type polarization plates.

Each of the polarization conversion plates is formed on a top or bottom surfaces of each of the reflection type polarization plates.

Each the reflection type polarization plate is formed of a metal polarizer having a grating pattern thereon.

Preferably, the metal is aluminum.

A gap between the metal polarizers is smaller than a wavelength of incident light upon the polarization conversion system.

The polarization conversion plate is a λ/2 plate converting a vertical linear polarized light to a horizontal linear polarized light, or converting a horizontal linear polarized light to a vertical linear polarized light.

Also, a light source optical system is constructed by arranging at a front end of the polarization conversion system a fly-eye lens for uniformly splitting an incident light beam and simultaneously converging the split light beams and a lamp, and disposing a panel at a rear end of the polarization conversion system.

The fly-eye lens and the polarization conversion system are arranged in such a manner that light emitted from the fly-eye lens is imaged to be incident only on the reflection type polarization plates and the polarization conversion plates.

The reflection type polarization plates and the polarization conversion plates are inclined at a same angle from a horizontal line.

The reflection plates are also inclined at a same angle with the reflection type polarization plates from a horizontal line.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a polarization conversion system according to a preferred embodiment of the invention in reference to the accompanying drawings.

Figure 3:
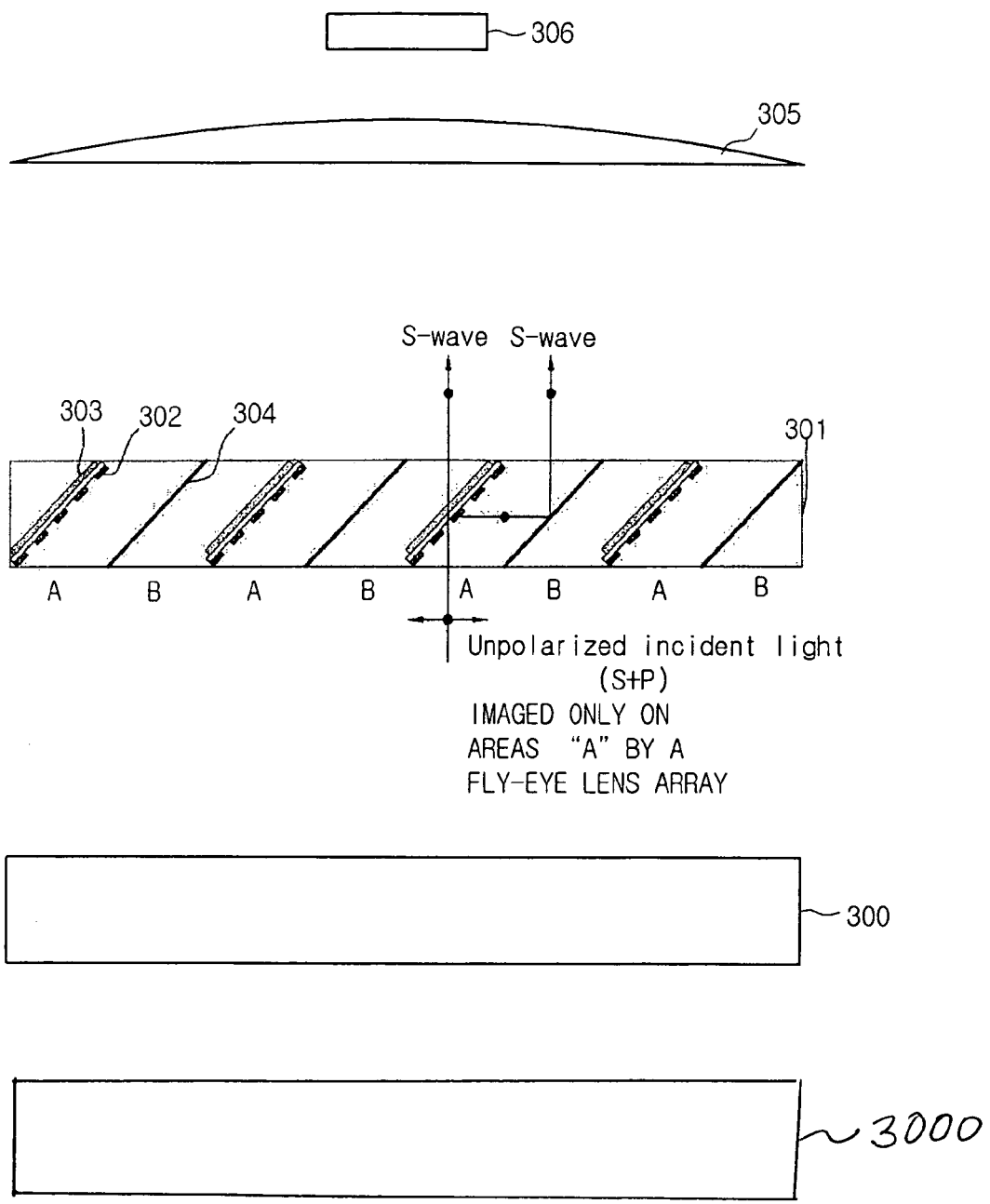
FIG. 3 is a cross-sectional view of a polarization conversion system according to a first embodiment of the present invention.

FIG. 3 is a cross-sectional view of a polarization conversion system according to a first embodiment of the present invention.

As illustrated in FIG. 3, the polarization conversion system according to the first embodiment of the present invention includes a glass substrate 301, reflection type polarization plates 302 inclined at a predetermined angle, separating unpolarized incident light into two polarization directions where two directions are at a right angle to each other, polarization conversion plates 303 positioned on top surfaces of the reflection type polarization plates 302, converting a polarization direction of polarized light by the reflection type polarization plates, and reflection plates 304 positioned in parallel with the reflection type polarization plates 302 and the polarization conversion plates 303, reflecting incident light from the reflection type polarization plates 302 and the polarization conversion plates 303. Fly-eye lens 300 uniformly splits a light beam incident on a front end of this embodiment and at the same time converging the split beams and emerges from a back end of this embodiment where it passes through relay lens 305 and travels to a panel 306.

Here, the light-receiving surface of each of the reflection type polarization plates 302 is usually made of highly reflective metals like aluminum, and forms a grating patterned polarizer.

For information, if a gap between the grating patterns is greater than a wavelength of incident light, the grating patterns formed on the reflection type polarization plate 302 acts as a diffraction grating. And if the gap is smaller than the wavelength of incident light, the grating pattern formed on the reflection type polarization plate 302 acts as a polarizer.

More specifically, the reflection type polarization plate 302 is a polarizer on which aluminum lines are implanted at smaller gap than the wavelength of incident light, and transmits vertically-vibrating light to the aluminum lines while reflects horizontally-vibrating light to the aluminum lines, thereby separating incident light from a light source Therefore, using the above features, the polarization conversion system of the present invention separates unpolarized incident light, by transmitting light with a fixed polarization direction employing the reflection type polarization plate 302 and reflecting light at a right angle to the transmitted light.

At this time, the light having been polarized and reflected by the reflection type polarization plate 302 is reflected by the reflection plate 304 in parallel with the reflection type polarization plate 302.

Particularly, the polarization conversion plate 303 formed on the reflection type polarization plate 302 is a λ/2 plate, and thus the direction of linear polarized light is converted therethrough. In other words, if the component of incident light upon the polarization conversion plate 303 is a S-wave (i.e. vertical linear polarized light), the polarization conversion plate 303 converts the S-wave to a P-wave (i.e. horizontal linear polarized light), and if the component of incident light upon the polarization conversion plate 303 is a P-wave, the polarization conversion plate 303 converts the P-wave to a S-wave.

In short, transmitting unpolarized light through the reflection type polarization plate 302 and the polarization conversion plate 303, it is possible to obtain polarized light in the same direction with the reflected/polarized light by the reflection type polarization plate 302.

Although the polarization conversion plate 303 can be formed on the top surface of the glass substrate 301 in such a manner that it is separated from the reflection type polarization plate 302 and perpendicular to incident light, in this case because the polarization conversion plate 303 is mounted on an outside, the overall structure of the polarization conversion system can be very complicated and the volume of the system is also increased. As a result, a higher precision is required.

Therefore, placing the polarization conversion plate 303 to be in contact with the reflection type polarization plate 302 or to be in parallel with the reflection type polarization plate 302, the construction of the polarization conversion system can be easy and simplified.

An operation of the polarization conversion system according to the first embodiment of the present invention is now explained.

At first, with the help of a fly-eye lens, unpolarized light is incident on a light-receiving surface of the reflection type polarization plate 302. For convenience of explanation, the light-receiving surface is named 'A' area.

When unpolarized light is incident upon the A area, the reflection type polarization plate 302 transmits a P wave out of the unpolarized incident light, and reflects an S wave.

The transmitted, polarized P wave by the reflection type polarization plate 302 is converted to an S wave as it passes through the polarization conversion plate 303 whose optical axis is preset at an angle of 45 degrees with respect to the P wave, and emitted later as the S wave. And, the reflected S wave from the reflection type polarization plate 302 is reflected again by the reflection plate 304, and emitted as it is.

To summarize, the P wave in the unpolarized light from a light source is converted to the S wave after passing through the reflection type polarization plate 302 and the polarization conversion plate 303, while the S wave is reflected by the reflection type polarization plate 302 and the reflection plate 304, and emitted as it is. Therefore, the polarization conversion system of the invention emits polarized S-waves only.

According to the polarization conversion system of the first embodiment, a polarization direction of the transmitted, polarized light by the reflection type polarization plate is changed with the help of the polarization conversion plate 303. In consequence, it is possible to obtain polarized light in the same direction with the reflected, polarized light by the reflection type polarization plate 302.

Figure 4:
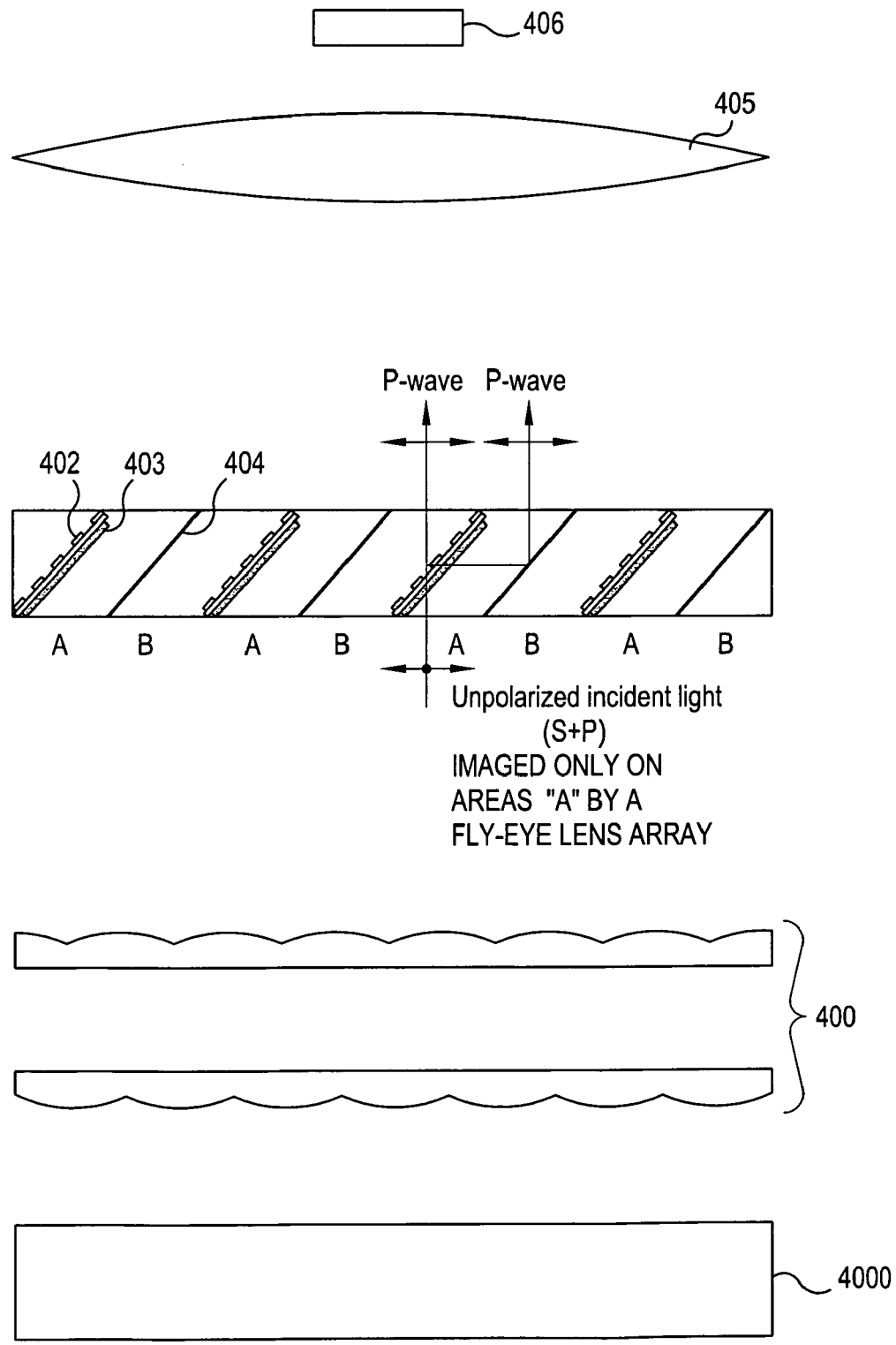
FIG. 4 is a cross-sectional view of a polarization conversion system according to a second embodiment of the present invention.

FIG. 4 is a cross-sectional view of a polarization conversion system according to a second embodiment of the present invention.

As depicted in the drawing, the polarization conversion system according to the first embodiment of the present invention includes reflection type polarization plates 402 inclined at a predetermined angle, separating unpolarized incident light into two polarization directions where two directions are at a right angle to each other, polarization conversion plates 403 positioned on bottom surfaces of the reflection type polarization plates 402, converting a polarization direction of polarized light by the reflection type polarization plates, and reflection plates 404 positioned in parallel with the reflection type polarization plates 402 and the polarization conversion plates 403, reflecting incident light from the reflection type polarization plates 402 and the polarization conversion plates 403. Fly-eye lens 400 uniformly splits a light beam incident on a front end of this embodiment and at the same time converging the split beams and emerges from a back end of this embodiment where it passes through relay lens 405 and travels to a panel 406. Light source 4000 is also shown in FIG. 4.

Since the polarization conversion system of the second embodiment is basically equal to that of the first embodiment, except that the positions of the reflection type polarization plates and the polarization conversion plates 403 are exchanged with each other, no further description will be provided here.

An operation of the polarization conversion system according to the second embodiment is explained below.

At first, with the help of a fly-eye lens, unpolarized light is incident on a light-receiving surface of the polarization conversion plate 403. Similar to the first embodiment, the light-receiving surface on the polarization conversion plate 403 is named 'A' area.

The unpolarized incident light upon the A area is usually a mixture of S-waves and P-waves in an approximately same ratio. When the unpolarized light is incident upon the polarization plate, an S wave in the unpolarized light is converted to a P wave, and a P wave in the unpolarized light is converted to an S wave before each being incident on the reflected type polarization plate 402. That is, other than the inverted polarizations of the unpolarized light, the unpolarized light is received to the reflection type polarization plate 402 as it is.

The P wave arrived at the reflection type polarization plate 402 is transmitted, and the S wave is reflected and polarized, respectively. Here, the P wave is emitted as it is. Meanwhile, the S wave travels again to the λ/2 plate, and is converted to a P wave and goes to the reflection plate 404.

The transmitted, polarized S wave by the reflection type polarization plate 402 passes through the λ/2 plate whose optical axis is inclined to the S wave at an angle of 45 degrees, and is converted to a P wave before being emitted.

Lastly, P-polarized light by the λ/2 plate is reflected by the reflection plate 404, and travels in the same direction with that of the transmitted, polarized P wave from the reflection type polarization plate 402.

According to the polarization conversion system of the second embodiment, using the reflection type polarization plate 403, a polarization direction of the reflected, polarized light by the reflection type polarization plate is changed, and using the reflection plate 404, the light is reflected. In consequence, it is possible to obtain polarized light in the same direction with the transmitted, polarized light by the reflection type polarization plate 402.

That is, unpolarized incident light is polarized and converted similarly by the reflective type polarization plate 302 or 402 in the first and second embodiments, in which one reflective type polarization plate transmits P-waves and reflects S-waves, and the other reflective type polarization plate transmits S-waves and reflects P-waves, except that the polarization direction of the lastly transmitted light is opposite in those two embodiments.

To be short, according to the polarization conversion systems in the first and second embodiments, incident light from a light source or unpolarized light transmitted through the polarization conversion plate 303 or 403 is transmitted and reflected by the reflection type polarization plate 302 or 402, and polarized into two components, respectively. One of those components (polarized lights) is converted by the polarization conversion plate 303 or 403 so that polarized light in the same direction with the other polarized light can be obtained.

When this kind of polarization conversion system is applied to optical systems like a projection type display device, it is typically used with a lamp and a fly-eye lens.

Figure 1:
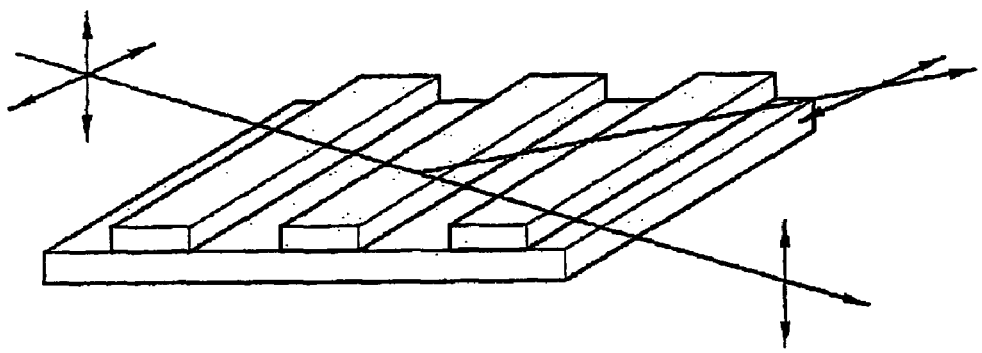
FIG. 1 illustrates one exemplary embodiment of a reflection type polarization plate in a related art.
Figure 2:
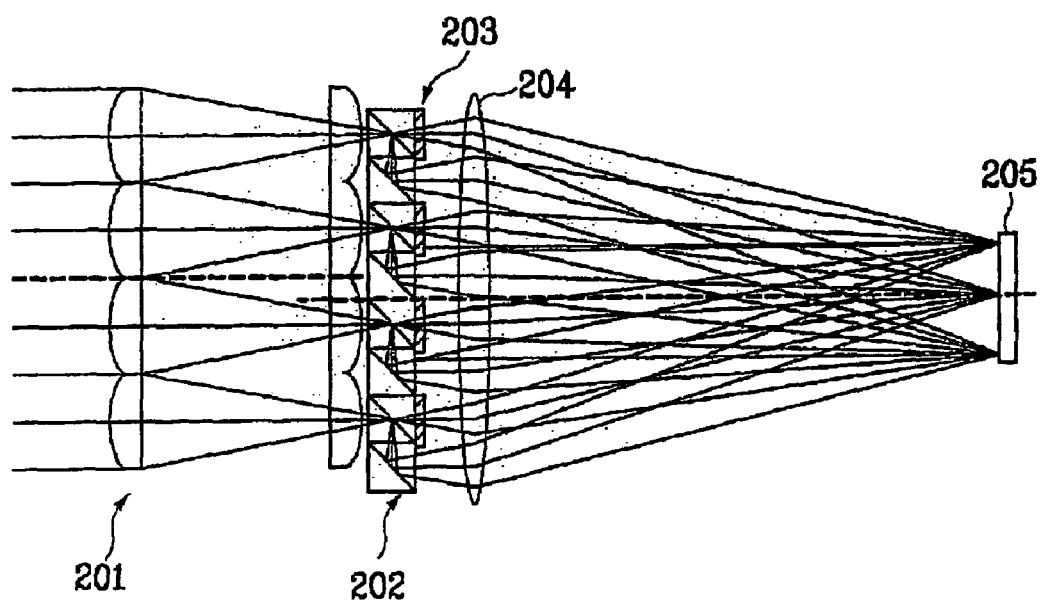
FIG. 2 illustrates one exemplary embodiment of a polarization conversion system to which a related art PBS array is applied.

In such case, the polarization conversion system is positioned where the PBS array in FIG. 2 is positioned. That is to say, the polarization conversion system of the present invention can be replaced with the PBS array to construct an optical system such as the projection type display device.

The fly-eye lens and the polarization conversion system are disposed at particular positions to manipulate transmitted light from the fly-eye lens imaged to be incident only on the A area in FIG. 3 and FIG. 4.

As discussed before, the light-receiving surface of each of the reflective type polarization plates 302 and 402 has a metal, particularly aluminum, grating pattern thereon, so, compared to the PBS lamination surface in the related art PBS array, it has several merits.

In other words, instead of using the refraction index of glass as in the related art, the polarization conversion system of the invention employs the reflection type polarization plate 302 or 402 mounted with a metal (i.e. aluminum) grating patterned polarizer. Thus, no problems occur due to changes in the refraction index.

Moreover, when the intensity of light from a light source (e.g. lamp) is increased, the related art PBS array was easily influenced by heat-induced refraction index changes, and thus the photoelasticity problem often occurred. The polarization conversion system of the invention, however, is not influenced by the intensity of incident light from a light source, and can be still used when the outside temperature ranges −40° C. to 200° C.

Also, the polarization conversion system of the invention reflects and/or transmits incident light, depending on a vibration direction of an electric field in a grating direction, and whether there are free electrons in that direction, so the system is much less sensitive to an angle of incident light. Here, this angle-dependent limit is defined by a case where light is incident at an angle of 45° and the incident light is reflected because of the resonance phenomenon between a wavelength of a P wave and a frequency of the grating pattern.

Although the resonance phenomenon is often observed in a blue wavelength band, the wavelength band can be reduced to less than 400 nm using known techniques. The allowable F/# of light in the present invention, therefore, can be increased to approximately F/1.8.

In conclusion, the polarization conversion system of the invention has the following advantages.

Using the reflection type polarization plate having a grating pattern and the polarization conversion plate coupled to the reflection type polarization plate, the polarization conversion system of the invention transmits and reflects/polarizes unpolarized light emitted from a light source, and converts the polarization direction of one of the transmitted or reflected/polarized lights, thereby obtaining uniformly polarized light. Therefore, the structure of the system is very simple, and deterioration in performance due to a PBS array's angle and heat is prevented. Also, the allowable angle of light can be as high as F/1.8.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A polarization conversion system having an incident light angle-dependent limit defined at 45 degrees and a F/# of approximately F/1.8, comprising:

a glass substrate;

reflection type polarization plates, formed between top and bottom surfaces of the glass substrate and inclined at a predetermined angle, separating unpolarized incident light into two polarization directions where the two directions are at a right angle to each other;

polarization conversion plates coupled to the reflection type polarization plates, converting a polarization direction of light polarized by the reflection type polarization plates;

reflection plates positioned in parallel with the reflection type polarization plates, reflecting incident light from the reflection type polarization plates;

wherein a light source optical system is constructed by arranging at a front end of the polarization conversion system a fly-eye lens array for uniformly splitting an incident light beam and simultaneously converging the split light beams and a lamp, and disposing a panel at a rear end of the polarization conversions system;

wherein the fly-eye lens array and the polarization conversion system are arranged in such a manner that light emitted from the fly-eye lens array is imaged to be incident only on the portion of the polarization conversion system with the reflection type polarization plates and the polarization conversion plates, wherein each of the polarization conversion plates is formed on a top or bottom surface of each of the reflection type polarization plates;

wherein the reflection type polarization plates and the polarization conversion plates are inclined at a same angle from a horizontal line;

wherein the reflection plates are inclined at a same angle with the reflection type polarization plates from a horizontal line; and wherein each reflection type polarization plate is formed of a metal polarizer having a grating pattern thereon the achieve the incident light angle-dependent limit defined at 45 degrees and an F/# of approximately F/1.8.

2. The system according to claim 1, wherein the metal is aluminum.

3. The system according to claim 1, wherein the grating pattern of a metal polarizer has elements and a gap between those elements of the metal polarizers is smaller than a wavelength of incident light upon the polarization conversion system.

4. The system according to claim 1, wherein the polarization conversion plates are λ/2 plates converting a vertical linear polarized light to a horizontal linear polarized light, or converting a horizontal linear polarized light to a vertical linear polarized light.

* * * * *